Aug. 6, 1940.   J. P. JOHNSON   2,210,295
VALVE
Filed Dec. 21, 1938
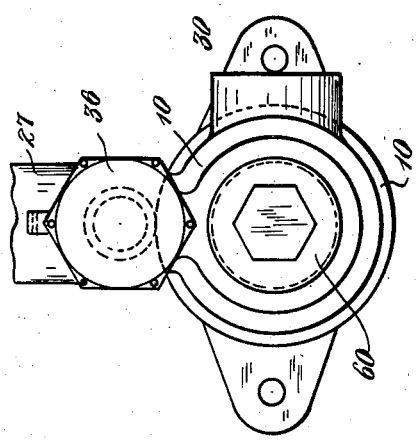
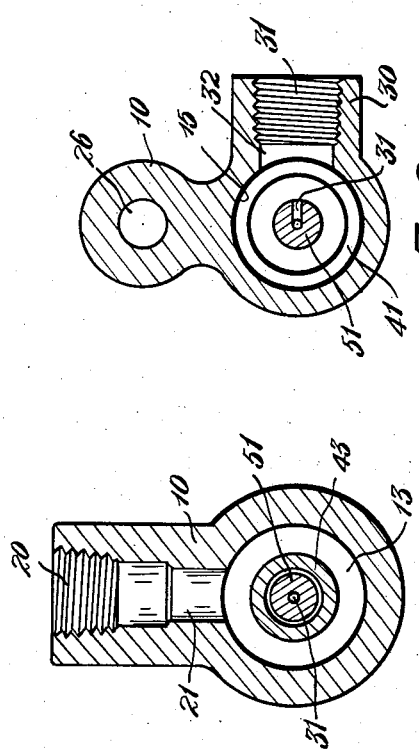
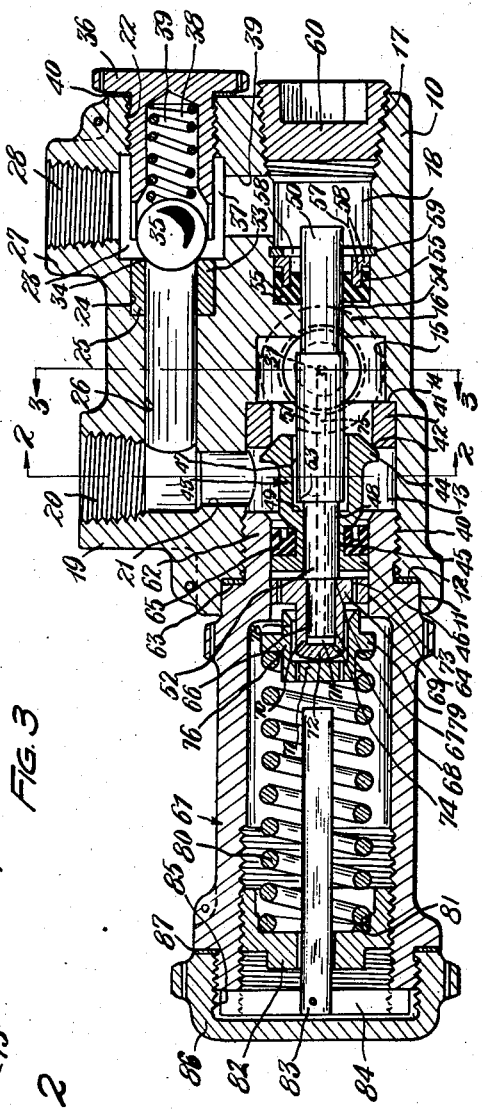
INVENTOR.
JAMES P. JOHNSON
BY
ATTORNEY.

Patented Aug. 6, 1940

2,210,295

UNITED STATES PATENT OFFICE 2,210,295

VALVE

James P. Johnson, Shaker Heights, Ohio, assignor, by mesne assignments, to Pump Engineering Service Corporation, Cleveland, Ohio, a corporation of Ohio Application December 21, 1938, Serial No. 246,950

5 Claims. (Cl. 137—153)

This invention relates to valves and more particularly to an improvement therein which renders the valve more especially adaptable for use on aircraft although such use is not restrictive.

In the operation of aircraft there are many instrumentalities operated by fluid pressure such as the retractible landing gear wherein the effective pressure must be maintained substantially constant during its working period. The pressure is usually provided by a directly connected motor driven oil pump the capacity of which varies with its R. P. M. with the result that after the effective pressure is reached further continuous operation of the pump produces overloading of the latter resulting in a loss of efficiency and undesirable wear upon the elements.

It is therefore, an object of the present invention to provide a valve interposed between the discharge side of a power driven oil pump and the inlet side of an actuating device for a landing gear or the like, which permits the flow of oil to the latter until the required pressure is established and thereafter maintaining said pressure but relieving the pump of its load, thereby materially increasing the life and efficiency of the pump.

A further object of the present invention is to provide means for reestablishing the flow of oil to the landing gear or similar instrumentality when the pressure therein drops below that required for the effective operation of the latter.

A still further object of the present invention is to provide a valve mechanism of the type referred to which is compact, simple to manufacture and assemble, efficient and inexpensive.

With the objects above indicated, and other objects hereinafter explained in view, my invention consists in the construction and combination of elements hereinafter described and claimed.

Referring to the drawing:

Figure 1 is a longitudinal sectional view of the valve assembly embodying the present invention.

Figure 2 is a transverse sectional view taken on line 2—2 in Figure 1 and showing further details of the structure.

Figure 3 is a transverse sectional view taken on line 3—3 in Figure 1.

Figure 4 is an end view of the valve assembly.

In the drawing I have illustrated a valve assembly embodying the present invention and designed particularly for use with certain types of instrumentalities employed in the operation of aircraft but it is obvious that it may have other adaptations where similar conditions are present and similar results desirable.

The valve assembly comprises a housing 10, preferably of cast aluminum or other suitable material, and of substantially the shape of the numeral 8 in cross section as shown in Figure 3. The housing at one end is provided with a bore 11 the base of which forms a shoulder or seat 12. A second bore 13 of smaller diameter extends axially inwardly from the bore 11 and its base forms a shoulder or abutment 14. The outer portion of the bore 13 is interiorly screwthreaded while the inner end communicates with a bore 15 of smaller diameter which extends axially inwardly, the base forming one side of a transversely extending partition 16 disposed between the opposite ends of the housing. The opposite end of the housing is likewise, provided with an axially disposed inwardly extending opening 17 interiorly screwthreaded and which opening at its inner end communicates with a bore 18 of smaller diameter extending axially inwardly, the base forming the other side of the partition 16. The housing 10 is further provided with a laterally projecting boss 19 having an inwardly extending opening 20 interiorly screwthreaded, and functioning as an inlet opening for the oil. The opening 20 communicates with one end of a passageway 21 the opposite end of which communicates with the bore 13 below the screwthreaded portion. The housing 10 at its outer end is provided with an inwardly extending opening 22 interiorly screwthreaded which communicates with an axially disposed inwardly extending bore 23 of slightly greater diameter. The inner end of this bore 23 communicates with a bore 24 of smaller diameter the base providing an abutment or shoulder 25. A passageway 26 extends through the housing connecting the passageway 21 with the bore 24. A laterally projecting boss 27 is provided at the outer end of the housing 10 and has an inwardly extending opening 28 interiorly screwthreaded, communicating with the bore 23 and a passageway 29 connects the bore 23 with the bore 18. The opening 28 functions as the outlet for the oil and is connected with the landing gear or similar pressure actuated device. The housing 10 is further provided with a laterally projecting boss 30 having an inwardly extending opening 31 interiorly screwthreaded which communicates by means of a passageway 32 with the bore 15 as more clearly shown in Figure 2. This opening 31 functions as an oil relief opening and is adapted for connection with the supply tank. The arrangement of the bores and passageways permits ready casting of the housing and simple machining.

A sleeve 33 of steel or other suitable material, is tightly fitted within the bore 24 and has its inner end abutting the shoulder 25 while its outer end is substantially flush with the base of the bore 23 to provide a valve seat 34 ahead of the outlet opening 28. A ball valve member 35 is movably disposed within the bore 23 and engageable with the valve seat 34 for controlling the flow of oil through the passageway 26. A plug 36 has a screwthreaded portion removably engageable with the screwthreaded opening 22 in the housing and annular spaced fingers 37 which maintains the ball valve member 35 in proper operating position. The plug 36 is further provided with an axial bore 38 within which a coiled spring 39 is disposed. The opposite ends of the spring engage the base of the bore 38 and the valve member 35 respectively and may be properly tensioned by adjusting the plug. A gasket 40 is disposed between the head of the plug and housing to provide a sealed joint. The valve 35 is also positioned so as not to interfere with the communication between the outlet opening 28 and the bore 18.

A sleeve 41 of steel or other suitable material, is securely fitted within the bore 13 and has its inner end abutting the shoulder 14 while its outer end terminates slightly below the passageway 21 providing a valve seat 42. A valve member indicated generally at 43 is movably mounted in the bore 13 and has a valve head 44 engageable with the valve seat 42. The valve member 43 has an outwardly extending neck portion 45 of reduced diameter terminating in a laterally extending peripheral flange or piston-like portion 46 of a diameter approximately equal to the diameter of the valve seat 42 and provided with a cooperating sealing ring to be described. The valve member 43 has a bore 47 extending axially inwardly from its inner end which communicates with an axial opening 48 of smaller diameter providing a shoulder or abutment 49. For moving the valve member 43 to open position, a plunger 50 is provided which has a portion 51 slidably disposed within the bore 47 and an outwardly projecting portion 52 of reduced diameter extending through the opening 48, thereby providing a shoulder 53 which is engageable with the shoulder 49 on the valve member. The portion 51 of the plunger extends axially outwardly and its end projects slidably through an opening 54 provided in the partition 16 and into the bore 18. A rubber ring 55 encircles the adjacent end of the plunger and is securely seated in the bore 18 in abutting relation with the partition. The outer face of the ring 55 is grooved circularly to receive the annular flange 56 of a pressure member 57 movably disposed in the bore 18. A spring snap ring 58 is used to compress the pressure member and rubber ring to effect a seal about the plunger and is maintained by a circular recess 59 formed on the inner wall of the bore 18. A plug 60 is removably inserted in the opening 17 to close the passageway whereby the pressure of the oil will react against the projecting end of the plunger for moving the latter outwardly to unseat said valve for a purpose to be later described.

Any suitable means may be employed for normally maintaining the valve member 43 in its closed position but preferably the construction and arrangement shown is simple to manufacture and assemble and yet has been found exceptionally efficient. A tubular extension 61 of cast aluminum or other suitable material, has a constricted inner end portion 62, exteriorly screwthreaded, and removably secured in the screwthreaded outer end of the bore 13 in the housing 10. A gasket 63 is disposed between the end of the extension and the shoulder 12 to provide a sealed joint. The constricted end portion 62 has a central opening 64 within which the flange 46 of the valve member is slidably disposed. A rubber sealing ring 65 encircles the reduced extension 45 on the valve member and is tightly fitted between the flange or piston-like portion 46 and the inner peripheral surface of the central opening 64 having a sliding engagement with the latter. This ring not only functions as a seal but more important it cooperates with flange 46 to partially balance the pressure on valve 44 in a manner to be later described. The outer end of the plunger 50 has a reduced end portion 66 providing a shoulder 67 adjacent the flange 46 of the valve member. A valve actuating member 68 has a laterally extending flange 69 slidably mounted in the central opening 64 and adapted to engage the flange 46 of the valve member to normally maintain the latter in closed position. The member 68 has an axial outwardly extending circular projection 70 having a rounded outer end and an axial bore 71 extending inwardly from the inner side of the flange, terminating in an end wall 72. The end 66 of the plunger is slidably disposed in the bore 71 the end of the plunger being slightly spaced from the end wall 72 when the flange 69 is in engagement with the shoulder 67. To eliminate the possibility of any pressure head tending to interfere with the efficient operation of the valve member openings 73 are provided in the flange 69 and openings 74 are provided in the end wall 72. An opening 75 is also provided in the adjacent end of the plunger extending centrally thereof and branching outwardly into communication with the relief opening 31. It will be understood of course, that these openings are always in communication.

A spring guide and retainer member 76 has an end wall 77 at its outer end normally engaging the rounded outer end of the member 68 and has a depending annular skirt portion 78 freely encircling the projection 70. The end wall 77 is also provided with openings to provide communication with the openings 73. The member 76 is further provided with a laterally extending circumferential flange 79 with which one end of a coiled spring 80 engages. The spring is disposed coaxially within the extension 61 and its outer end fits into a bore 81 formed on the under side of an exteriorly screwthreaded plug 82. The outer end of the extension 61 is interiorly screwthreaded to adjustably receive the plug and adjustment of the latter predeterminately tensions the spring 80. To readily and quickly adjust the plug, a non-circular rod 83 slidably projects through a non-circular opening in the plug and the outer end is connected to the central portion of a bar 84 extending transversely. The outer ends of the bar are adapted to be disposed in any two diametrically opposite recesses 85 of a plurality of radially spaced recesses to maintain proper tensioning of the spring. A cap 86 closes the outer end of the extension 61 being screwthreaded thereon and at the same time prevents accidental displacement of the bar 84. A gasket 87 is provided between the end of the cap and a shoulder on the extension to provide a sealed joint.

In the application and operation of the valve, the inlet opening 20 is connected with the outlet or discharge opening of a power driven hydraulic pump. By power driven is meant that the pump is either connected directly with the motor or through a suitable gear box for its operation and the inlet or intake side of the pump is connected with the fluid supply tank. Oil is usually the fluid medium used and where I speak of oil it will be understood that its use is figuratively only. The outlet opening 28 is connected with the actuating mechanism of the landing gear or similar pressure response device, and the usual return line is provided between the landing gear and fluid supply tank. The relief opening 31 is connected with the fluid supply tank. It is to be noted, that the inlet side of the hydraulic pump is connected with the fluid supply tank in the usual manner.

With the valve assembly thus connected, let us assume that the effective pressure for operating the landing gear is 500 pounds per square inch and that this pressure must be maintained as a minimum for a period of time concurrent with its intended purpose. The spring 80 must first be adjusted to exert substantially the same pressure on the valve member 43 so that the latter is normally maintained in closed position in engagement with its valve seat 42. The pump is next operated, in the manner heretofore described, and fluid is drawn from the fluid supply tank into the pump and discharged under pressure from the outlet side or opening. The discharged fluid enters the inlet opening 20, in the valve assembly, passing downwardly through the passageway 26, unseating the spring pressed ball valve member 35, and flows through the outlet opening 28 to the actuating mechanism of the landing gear. When the pressure of the introduced fluid reaches 500 pounds per square inch, the desired actuating minimum pressure, continued operation of the pump tends to build up a greater pressure with the result that the pump would ordinarily be greatly overloaded resulting in injury and unnecessary wear. The fluid which has passed the ball valve also fills the passageway 39 and the bore 18. The introduced fluid also flows through the passageway 21 and into the bore 13 the pressure exerting a force against the valve head 44 tending to seat the same and a like force against the sealing ring 65 tending to unseat the valve. By reason of the valve seat 42 being greater than the diameter of the central opening 64 in which the ring 65 reciprocates, a differential valve actuating pressure is provided. This pressure differential may be varied to suit the conditions present by varying the size of the valve seat 42 with respect to the diameter of the central opening 64 and this pressure differential is the same as the excess pressure created in the landing gear line above the minimum effective pressure of 500 pounds per square inch as adopted for explanation.

Therefore, when the pressure of the fuel in the landing gear reaches this excess, it exerts a force against the bottom or large end of the plunger 50 causing it to rise or move against spring 80 in the direction of compression. When the plunger rises to the point of engagement with the valve member 43 the latter is moved out of engagement with its seat thus relieving the pressure within the bore 13. This causes the ball valve member 35 to engage its seat and the fluid at the present pressure in the landing gear line is maintained for its purpose. At the same time the fluid from the pump passes by the valve 43 and out through the relief opening 31 to the fluid supply tank. This reduces the load on the pump to a minimum because there is practically no pressure in the line.

Now, as the pressure in the landing gear line drops due to any reason whatsoever, below a definite value depending upon the setting of the device, the plunger 50 is depressed or moved to the right in Fig. 1 by means of spring 80 thereby moving the valve member 43 toward its seat. As the drop in pressure approaches and finally reaches the effective predetermined pressure to be maintained, the valve member 43 has engaged its seat 42 which interrupts the flow of fluid through the relief opening and reestablishes the flow of fluid under pressure through the passageway 26, unseating the ball valve member 35 and into the landing gear line. The plunger in the meantime having been moved to its lowermost position with its end projecting into the bore 18 independently of the valve member 43. The pump is operated under load just long enough to raise the pressure of the fluid in the landing gear line above the minimum effective pressure by an amount substantially equal to the pressure differential under which the valve is actuated. This operation of the valve continues so long as there is need for operation of the landing gear.

While I have described the preferred embodiment of the invention, it should be understood that I am not to be limited thereto, inasmuch as changes and modifications may be resorted to without departing from the spirit of the invention as defined in the appended claims.

What is claimed is:

1. In an automatic pressure regulator, a housing formed with a threaded inlet opening, a threaded outlet opening, means defining a passage connecting said inlet and said outlet opening, said means including a check valve, a threaded return opening formed in said housing, means defining a passage leading from said inlet to said return opening, said means including a valve seat, a valve assembly including a disc-like valve normally received on said seat cutting off communication between said inlet and said return passage, said valve assembly being particularly characterized by the provision of a tubular stem extending from the back face of said valve and terminating in a piston-like flange, said housing being formed with a cylindrical bore for receiving said piston-like flange, a sealing ring between said bore and flange, the effective pressure area of said disc-like valve tending to hold said valve closed being being made a predetermined amount greater than the effective pressure area of said seal and piston-like flange whereby there is provided a differential force acting on said valve tending to hold the same on said seat, which force is only a small fraction of the inlet pressure to which said valve assembly is subjected, a cylindrical plunger member passing through said valve assembly and supporting the same intermediate the ends thereof, said plunger being in communication at one end with the fluid beyond said check valve, said plunger having a limited axial movement relative to said valve and being provided with means for engaging said valve upon such movement in one direction to raise the same from said seat, means associated with the rear end of said plunger including a long sensitive helical spring, a bonnet-like member mounted on the rear end portion of said plunger and engaging one end of said spring adjusting means carried by said housing and engaging the other end of said spring for determining the compression thereof, said fluid pressure in communication with said plunger being effective when the same reaches a predetermined maximum value to force said plunger axially relative to said valve for actuating the same to place said inlet in communication with said return passage whereby to control the pressure delivered to said outlet.

2. A valve assembly comprising a housing having a fluid inlet opening adapted for connection with the discharge side of a fluid pump and a fluid outlet opening adapted for connection with a fluid pressure actuated device, said housing having a connecting passageway between said inlet and outlet openings, a check valve associated with said connecting passageway, said housing further having a fluid return opening adapted for communication with the fluid pump and a return passageway affording communication between said inlet opening and said return opening, said return passageway being provided with a valve seat disposed toward said inlet opening, a valve member having a lateral piston-like portion at one end reciprocable in a cylinder-like portion formed in said housing in opposed relation to said valve seat and a disc-like valve at the opposite end of said valve member normally engageable with said valve seat for interrupting communication between said inlet opening and said return opening, said lateral piston-like portion and disc-like valve both being subjected to the incoming fluid and having relatively different effective pressure areas to provide an unbalance of said valve member urging the same in the direction of said valve seat with a predetermined pressure differential, resilient means adjustably mounted in said housing and operatively associated with said valve member for effecting a predetermined load on the latter, and valve operating means movably mounted in said housing and operatively associated with said valve member for effecting movement of the latter from its seat, said valve operating means having a portion in communication with the fluid at said outlet opening and actuated by the pressure of the fluid when in excess of that corresponding to a predetermined loading on said valve member whereby said valve head is moved from its seat to permit the incoming fluid to flow substantially unrestrictedly through said return passageway and return opening thereby relieving the load on the pump, said valve member being closed when the pressure of the fluid in the outlet opening drops below that for which said valve member is predeterminately loaded to interrupt the flow of fluid through the return passageway thereby reestablishing the flow of fluid between said inlet opening and said outlet opening until the desirable actuating pressure is again effected.

3. A valve assembly comprising a housing having a fluid inlet opening adapted for connection with the discharge side of a fluid pump and a fluid outlet opening adapted for connection with the inlet side of a fluid pressure actuated device, said housing having a connecting passageway between said inlet and outlet openings, a check valve associated with said connecting passageway, said housing further having a fluid return opening adapted for communication with the fluid pump and a return passageway affording communication between said inlet opening and said return opening, said return passageway being provided with a valve seat disposed toward said inlet opening, a valve member having a lateral piston-like flange at one end slidably and sealably mounted in cylinder-like portion of said housing and a disc-like valve in spaced relation to said flange and connected thereto by a portion of reduced cross-section, said valve being normally engaged with said valve seat for interrupting communication between said inlet opening and said return opening, said lateral flange and valve both being subjected to the incoming fluid and having relatively different effective pressure areas to provide an unbalance of said valve member in the direction of said seat with a predetermined pressure differential, resilient means adjustably mounted in said housing and operatively associated with said valve member for adding a predetermined load on the latter in addition to said differential pressure load, and valve operating means movably mounted in said housing and operatively associated with said valve member for effecting movement of the latter whereby said valve head is removed from its seat, said valve operating means having a portion in communication with the fluid at said outlet opening and actuated by the pressure of the fluid when in excess of that effected by the predetermined loading on said valve member whereby said valve head is moved from its seat to permit the incoming fluid to flow substantially unrestrictedly through said return passageway and return opening thereby relieving the load on the pump, said valve member being alternately seated and unseated as the pressure of the fluid at the outlet opening varies between that for which said valve member is differentially effective whereby the desired pressure of the fluid is maintained.

4. A valve assembly comprising a housing having a fluid inlet opening adapted for connection with the discharge side of fluid pump and a fluid outlet opening adapted for connection with the inlet side of the fluid pressure actuated device, said housing having a connecting passageway between said inlet and outlet openings, a check valve mounted in said connecting passageway, said housing further having a fluid return opening adapted for return communication with the fluid pump and a return passageway affording communication between said inlet opening and said return opening, said return passageway being provided with a valve seat disposed toward said inlet opening, a valve member movably mounted in said housing and having a valve head normally engageable with said valve seat for interrupting communication between said inlet opening and said return opening, means in said housing associated with said valve member for effecting a predetermined load on the latter tending to hold the same closed, said valve member being further particularly characterized by the provision of a tubular stem of reduced cross-section extending axially from the back side of said head, said stem terminating in an enlarged piston-like portion slidably and sealably received in a cylindrical chamber formed in said housing in communication with said inlet, said valve head being constructed with an effective pressure area tending to hold said valve closed in response to inlet fluid pressure, which area is greater than the corresponding pressure area of said piston-like portion tending to open said valve in response to inlet pressure, a rod slidably mounted in said housing and operatively associated with said valve member for effecting movement of the latter whereby said valve head is removed from its seat, said rod having a portion in communication with the fluid at said outlet opening and actuated by the pressure of the fluid when in excess of that effected by the predetermined loading on said valve member whereby said valve head is moved from its seat to permit the incoming fluid to flow substantially unrestrictedly through said return passageway and return opening thereby relieving the load on the pump.

5. A valve assembly comprising a housing having a fluid inlet opening adapted for connection with the discharge side of a fluid pump and a fluid outlet opening, said housing having a connecting passageway between said inlet and outlet openings, a check valve in said connecting passageway, said housing further having a fluid return opening adapted for communication with said fluid pump and a return passageway affording communication between said inlet opening and said return opening, said return passageway being provided with a valve seat disposed toward said inlet opening, a valve assembly including a disc-like valve normally engaged with said valve seat, a tubular stem extending axially from the back side of said valve, said stem terminating in means defining a piston-like portion slidably and sealably received in a cylindrical chamber formed in said housing in communication with said inlet, said disc-like valve being constructed with an effective pressure area tending to hold said valve closed in response to inlet fluid pressure which area is greater than the corresponding effective pressure area of said piston-like portion tending to open said valve in response to inlet pressure, a plunger rod passing through said valve assembly and slidably supporting the same intermediate the ends of said plunger, the forward end of said plunger being in communication with the fluid at said outlet opening and actuated by the pressure of said fluid when in excess of a predetermined amount to move said plunger axially rearwardly of said valve supported thereby, said plunger being provided with means contacting said valve upon said rearward movement for opening the same, a sensitive helical coil spring associated with said valve assembly for placing a predetermined additional pressure thereon in the valve closing direction, and means carried by said housing for adjusting the compression of said spring.

JAMES P. JOHNSON.